United States Patent [19]
McLaren et al.

[11] 3,859,068
[45] Jan. 7, 1975

[54] PLEATED AIR FILTER

[75] Inventors: James C. McLaren; Bruce E. Reber, both of Racine, Wis.

[73] Assignee: Tenneco Inc., Racine, Wis.

[22] Filed: May 9, 1972

[21] Appl. No.: 251,693

[52] U.S. Cl............... 55/498, 55/510, 55/521, 156/227, 161/132, 210/493
[51] Int. Cl............................................ B01d 27/06
[58] Field of Search...... 210/493, 487; 55/498, 510, 55/521; 93/60, 10; 161/132; 156/227

[56] References Cited
UNITED STATES PATENTS

| | | | |
|---|---|---|---|
| 3,052,526 | 9/1962 | Cook et al. | 55/498 |
| 3,640,396 | 2/1972 | Brownell | 55/510 |
| 3,681,898 | 8/1972 | Hopkins et al | 55/510 |
| 3,686,837 | 8/1972 | Hopkins et al | 55/510 |

*Primary Examiner*—Bernard Nozick
*Attorney, Agent, or Firm*—Harness, Dickey & Pierce

[57] ABSTRACT

A flat profile air filter construction has a pleated paper filter element with scored peripheral edges that are tucked and compressed and bound inside of resilient seals that seat on ledges inside the air filter housing.

7 Claims, 8 Drawing Figures

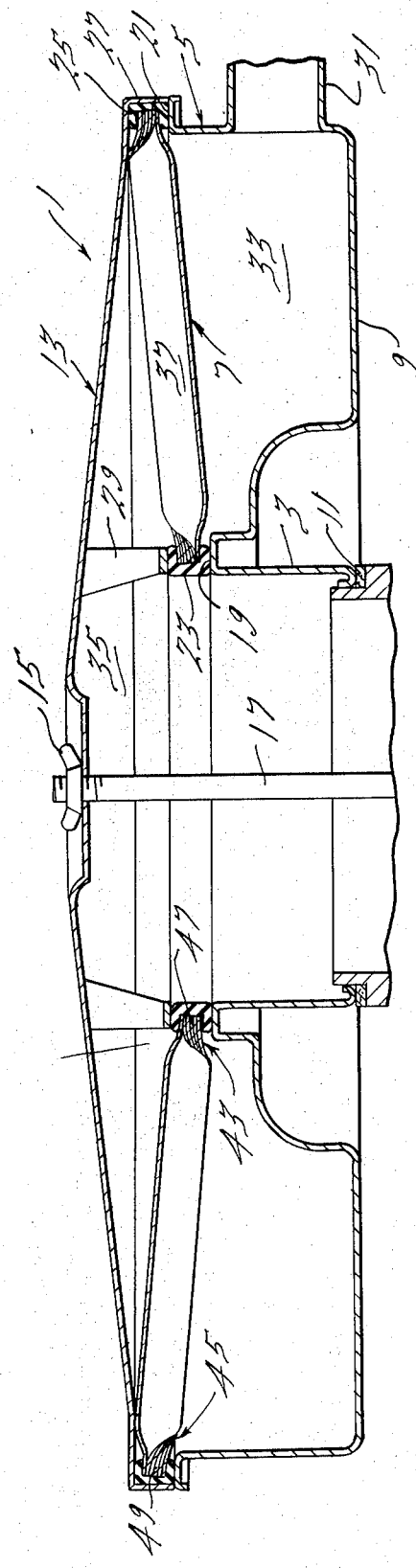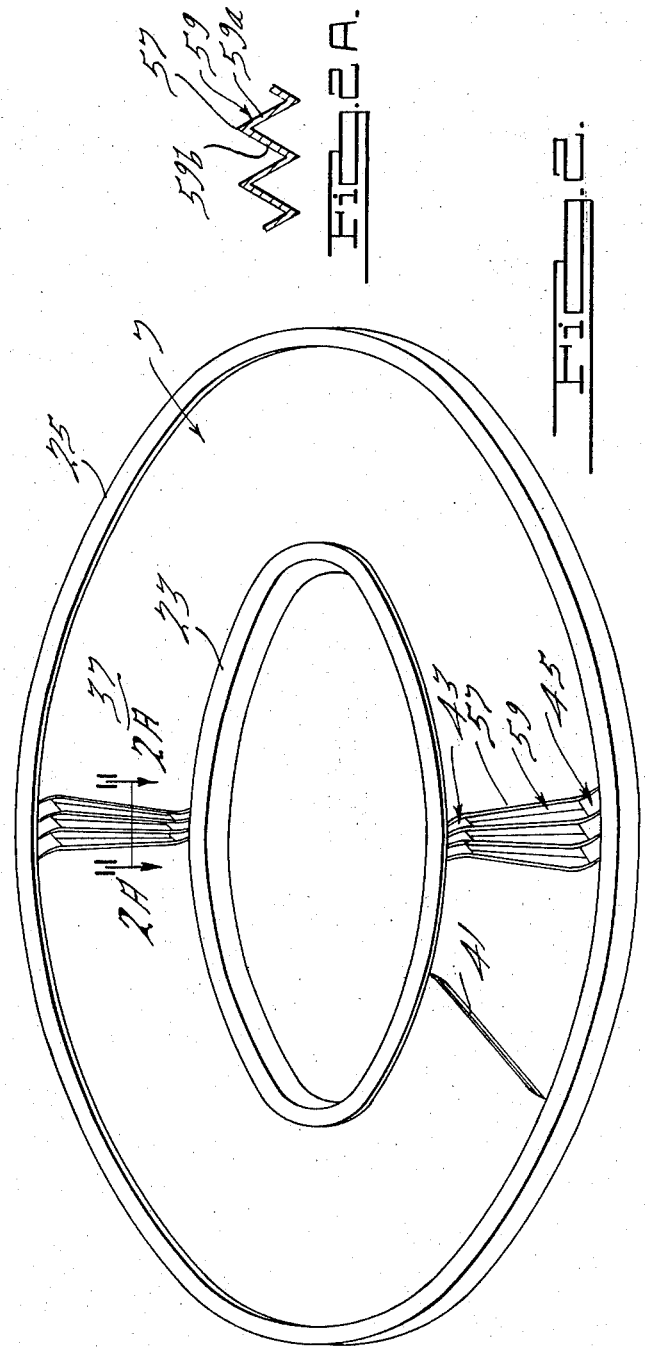

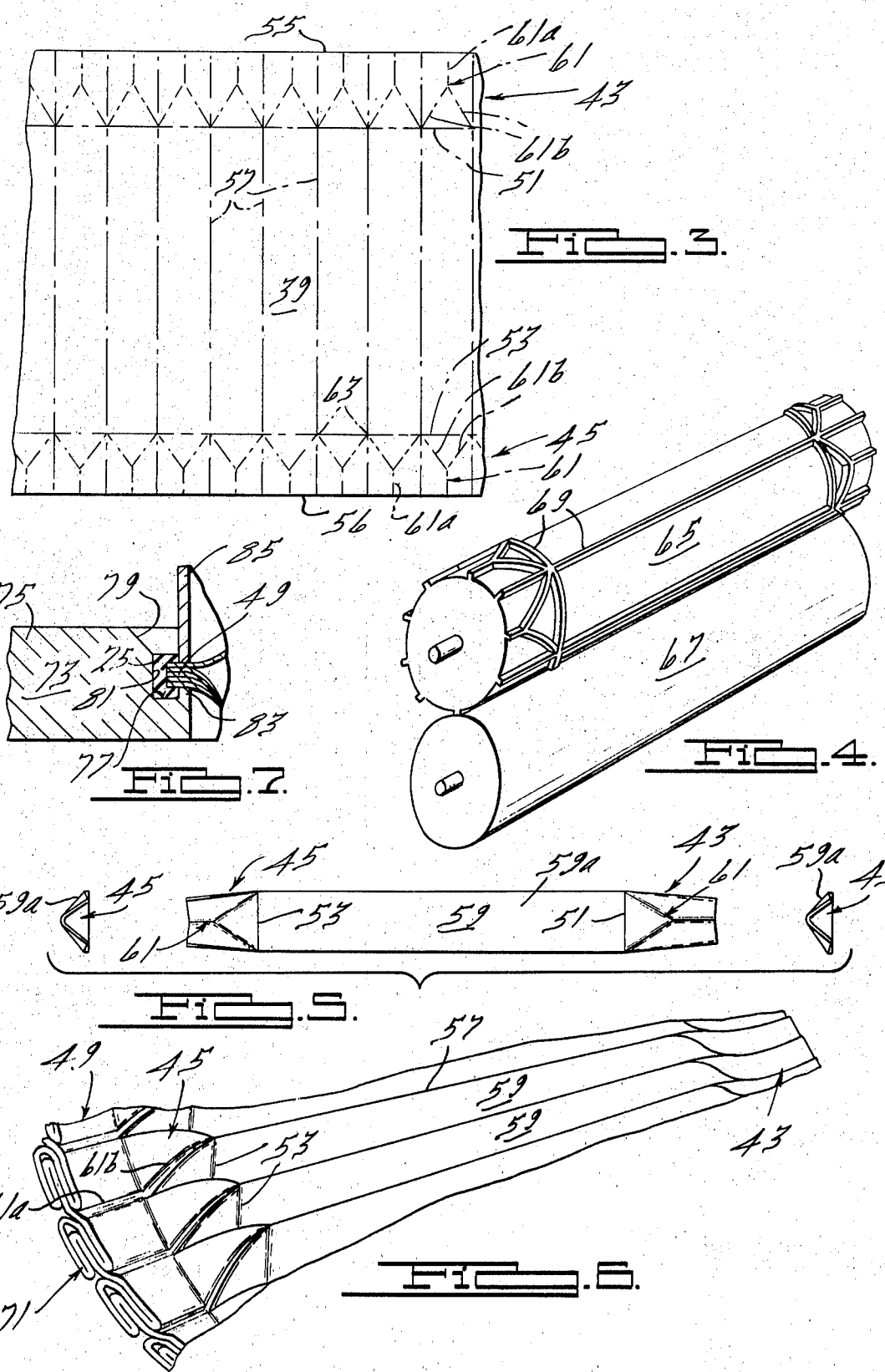

//3,859,068

PLEATED AIR FILTER

RELATED APPLICATIONS

The subject matter of this application is related to that disclosed in copending U.S. applications of John D. Hopkins et al. Ser. No. 797,466 filed Feb. 7, 1969 now U.S. Pat. No. 3,686,837 issued Aug. 29, 1972, and Ser. No. 58,395 filed July 27, 1970 now U.S. Pat. No. 3,681,898 issued Aug. 8, 1972, both applications being assigned to the assignee hereof.

BRIEF SUMMARY OF THE INVENTION

It is the purpose of the invention to provide an improved manner of reducing the thickness of the periphery of a pleated material fluid filter in order to facilitate its formation into a mounting rim.

The invention accomplishes this purpose by scoring the periphery in a certain way so that upon compression of the periphery, the ends of the pleats collapse as tucks in a predetermined and orderly fashion.

DESCRIPTION OF THE DRAWINGS

FIG. 1 is an axial cross section, partly broken away, through a flat silhouette automotive internal combustion engine air filter construction containing an air filter element embodying the invention;

FIG. 2 is a perspective view of an air filter embodying the invention;

FIG. 2A is a section, enlarged, along line 2A—2A of FIG. 2;

FIG. 3 is a plan view of a broken away strip of filter paper or material prior to pleating and shows score lines in accordance with this invention;

FIG. 4 is a perspective view of scoring rolls that may be used to form the score lines of FIG. 3;

FIG. 5 is a side view of a pleat leg showing an intermediate stage in compression of the pleat peripheries;

FIG. 6 is a perspective view, broken away, of filter materials embodying the invention in the pleated and periphery compressed condition ready for attachment to a resilient sealing member; and FIG. 7 is a broken away view of a mold arrangement for molding a resilient seal on the peripheral rim of the pleated paper.

DESCRIPTION OF THE INVENTION

An air filter construction 1 suitable for the carburetor intake 3 of an automotive internal combustion engine, comprises a housing 5 supporting an air filter element 7 that embodies the invention. The housing 5 has a lower bowl-like section 9 that seats on a shoulder 11 of the intake pipe 3 and a removable cover section 13 which is held in place by a wing nut 15 that threads on the end of a rod 17 that is fixedly supported inside of the intake. The section 9 has inner and outer annular ledges 19 and 21 that serve as seats to support inner and outer annular resilient sealing members 23 and 25 for the element 7. The right angle outer annular corner 27 on cover 13 serves to hold member 25 on ledge 21 while a hold down piece 29, attached to cover 13, serves to hold member 23 on ledge 19. The lower section 9 of the filter 1 has an inlet 31 for air to reach an inlet chamber 33 on the upstream side of filter 7, filtered air passing into outlet chamber 35 and then down the inside of intake 3 to the carburetor.

Extending between and secured to the sealing members 23 and 25 is suitable filter material 37 such as commercially available air filter paper of suitable thickness for use in automotive engines. Such paper has a high relative retention and low restriction to flow and is usually composed of cellulose fibers impregnated with phenolic resin to the extent of approximately 20 to 25 percent of the paper weight. The paper comes in bands or sheets that are straight and of suitable width, such as the band 39 of FIG. 3. This is pleated across its full width into as many pleats as desired and then turned into the annulus 37 and the opposite ends of the band heat sealed together in a joint 41.

In accordance with the invention, the band of filter paper is scored in a particular way to facilitate pleating and also to facilitate the axial compression of the inner and outer annular peripheral portions 43 and 45 of the annulus 37 into the inner and outer annular rims 47 and 49 which are preferably molded inside of the inner and outer sealing members 23 and 25. Longitudinal score lines 51 and 53 that are parallel to the side edges 55 and 56 of the band act with the respective edges to substantially define the respective inner and outer portions 43 and 45. Preferably, the score line 51 is spaced farther from its adjacent edge 55 than is the line 53 from its adjacent edge 56, i.e., inner section 43 is wider than outer section 45. The main body of the paper lies between the score lines 51 and 53. The score lines 51 and 53 serve as hinge lines for bending of the paper in a circumferential direction when pleated sections 43 and 45 are axially compressed into rims 47 and 49.

The band 39 is scored by lines 57 that extend at right angles to the edges 55 and 56 and from edge to edge; and, in accordance with conventional pleating practice, lines 57 serve as the hinge lines and apices of the V-shaped pleats 59 that are formed in a zig-zag or oppositely extending manner in the band. Each pleat 59 consists, of course, of two sides or legs 59a and 59b (FIG. 2A) and adjacent pleats are reversed in direction and have a common side. As seen best in FIG. 2, the hinge lines 57 and the pleats 59 become radial when the band is formed into the filter annulus 37. Thus, the width of the inner ends of each pleat is somewhat less than the width of its outer end, i.e., adjacent pleats are crowded together on the inner diameter as compared with the spacing between them on the outer diameter. This factor is one of those making it important to have an orderly and predetermined deformation of the inner and outer portions 43 and 45 when the rims 47 and 49 are formed and is accommodated, in part, by the preferably wider section 43 as compared with 45.

In axial reduction of the outer portions 43 and 45 to the thickness of rims 47 and 49, there is excess material in the ends of each pleat 59, due to the reduction in height. Since the filter elements 7 find a primary application in the automotive industry they must be capable of manufacture in huge quantities at a rapid rate and this means that the handling of the excess paper at the pleat ends cannot be on a random or haphazard basis. Thus, in further accord with the invention, the sections 43 and 45 are provided with score lines 61, which are preferably symmetrical Y-shaped as shown in FIG. 3, that cause the formation of a tuck in each end of each pleat side 59a and 59b when the ends of pleats are axially compressed, including a doubling or folding over of the pleat along a midline as defined by the Y-stem 61a. The stem 61a of the Y-score line extends to the outer edge 55 or 56 of the band and is midway between adjacent score lines 57 and the sides 61b of the V-part of the Y-shape and have tips that extend to the adjacent intersections 63 of the lines 51 or 53 and lines 57, all as shown clearly in FIG. 3. The stem section 61a of the Y-line is preferably about the same length as the width of the flattened rim 47 or 49 and the lengths of the V-part are simply sufficient to reach the intersections 63. The overall lengths of the Y-shapes correspond to the spacing of the lines 51 and 53 from the respective edges 55 and 56 and this spacing is selected to provide reliably uniform and orderly axial compression, folding and positioning of the paper on the inner and outer peripheries. The spacing may be the same on each side or it may be different as illustrated.

The various score lines 51, 53, 57, and 61 may be readily formed in the band 39 by passing it through a set of rolls 65 and 67 of the type illustrated in FIG. 4. Roll 65 carries a series of rods 69 which indent or score one side of the paper passing through the rolls. It is apparent from FIG. 4 that the rods are arranged to produce the score pattern shown in FIG. 3.

In making the filter element annulus 37, the band 39 is scored by suitable means such as rolls 65 and 67 and then pleated by suitable means, such as a conventional pleating machine, which causes bending along lines 57 into a zig-zag shape such as seen in FIG. 2A. The pleated band is then turned into an annulus and the ends heat sealed together in joint 41. Pressure is then applied in a suitable manner to cause folding or bending of each end of each pleat side about the score lines 51, 53, and 61, FIG. 5 showing an early stage in the bending of a pleat side 59a. All sections 43 are bent to fold in one direction transverse to the height or axis of the annulus and all sections 45 are bent to fold in the opposite direction, as seen best in FIGS. 2 and 5, so that the pleats nest together at each end. As the bending proceeds, completed oppositely directed tucks are formed in each pleat side and when this has advanced to the stage where each pleat has properly directed tucks initiated in each end, heavy axial compression is applied in alignment with the Y-stem 61a ends to flatten the paper into the rims 47 and 49. Because the score lines cause predetermined bending, final compression or crimping of the inner and outer edge portions, corresponding to Y-stems 61a, produces an orderly interfitted pattern of doubled over edges of adjacent pleat ends as seen at 71 in FIG. 6. Since each pleat side is folded double and each pleat has two sides, the rims are four layers of paper plus one overlap layer in face to face contact as seen in FIG. 6. The crushed inner and outer edges are then heat set under pressure at a desired thickness so that the pleat portions in each rim 47 and 49 are adhered to each other. The resin in the paper serves as an adhesive for this purpose or additional adhesive can be used if desired or necessary. The rims 47 and 49 are thus substantially flat and define planes transverse or normal to the axis of the annulus 37. The paper annulus 37 now is a unitary part with integral inner and outer rims 47 and 49 and at this point is actually capable of use as a filter element since the rims are resilient and can serve as a sealing means; or a portion thereof, in appropriate installations.

Preferably, however, resilient sealing members 23 and 25 are placed permanently around the rims 47 and 49. The members are preferably formed by molding on to the rims; and mold equipment 73 such as that shown partially in FIG. 7 may be used for that purpose. The mold 73 comprises a mold member 75 with an annular cavity 77 having a tapered funnel inlet 79 and a uniform diameter bottom section 81 with an inner annular lip 83. The rim 49 is supported on lip 83 and held in place by vertically movable sleeve 85 which is aligned with the lip and forms a movable wall for cavity 77. When the sleeve is in place, a suitable moldable and curable thermoplastic or thermosetting resilient binder and sealing resin, such as plastisol, is poured into funnel inlet 79 to surround the rim 49 and form after curing, by heating of the mold to the required temperature, the substantially C-shaped sealing member 25. The mold is, of course constructed to also form the sealing member 23 on the rim 47. The sealing members 23 and 25 are then permanently secured to the paper section 37. The width of the sealing members corresponds with the widths of the respective rims 47 and 49 which corresponds with the lengths of the respective Y-stems 61a.

Thus, the invention provides a flat fluid filter element capable, among other applications, of use as an air filter element in an automotive air filter construction, the element comprising a pleated annulus 37 having inner and outer scored and axially reduced sections 43 and 45 bent into tucks and compressed at the edges into rims for attachment to suitable mounting and sealing means, such as members 23 and 25. The tucks serve to gather and collect excess paper at the pleat ends in a predetermined manner, without the need for cutouts, when the ends are compressed to form rims.

Modifications may be made in the specific structure illustrated and described without departing from the spirit and scope of the invention.

We claim:

1. A fluid filter element adapted for a flat silhouette type fluid filter construction comprising a sheet of filter material having a series of substantially V-shaped pleats formed therein, each pleat having a pair of sides and adjacent pleats being oppositely directed and having a common side, and at least one end portion of each of said pleat sides having score lines therein and being transversely bent along said score lines to provide a tuck of predetermined shape and position in each said end portion, each said tuck tapering in height as it approaches the outer edge of the pleat side to provide an outer pleat edge that is substantially shorter than the main portion of the pleat, said score lines including a V-shaped portion located in each pleat side to provide for said tuck taper along opposite longitudinal portions of each pleat side, said score lines including a stem extending from the apex of said V-shaped portion to provide a Y-shaped portion and the Y-stem aligned portions of the pleat sides being crushed to form a rim for the filter material.

2. A filter as set forth in claim 1 wherein said score lines include a line extending transversely across each pleat side at substantially the tip ends of each V-shaped score line portion and defining the inner end of the tuck in said pleat side.

3. A filter element for air or the like comprising a sheet of pleated filter material in the form of an annulus with the pleats extending radially of the axis of the annulus and across the full width of the annulus, each pleat comprising two radially extending sides and adjacent pleats having a common side, said sides having inner and outer end portions and the sheet having score lines therein located in said end portions, said end portions being bent and folded about said score lines to form inner and outer mounting rims comprising at least two layers of said sheet in face to face contact with each other, said rims having a thickness materially less than the axial height of said pleats, said score lines defining tucks in said inner and outer portions that extend substantially transversely to and out of the plane of the sides in which they are formed, the tucks in the respective adjacent end portions of adjacent pleat sides extending in the same circumferential direction and being nested together, the tucks in the inner end portions extending on one side of the pleat side and the tucks in the outer end portions extending on the opposite side of the pleat side, each pleat side being folded double adjacent the outer edge of each end portion and being disposed in said rims, said rims defining planes that are substantially normal to the axis of the annulus, said score lines comprising a Y-shaped section with the stem of the Y extending to the adjacent edge of the sheet and a straight section extending across the tips of the Y-section, the tips of said Y-section extending to opposite edges of said pleat side.

4. A filter as set forth in claim 3 including resilient annular sealing members encasing said rims.

5. A blank for forming a pleated filter element comprising an elongated strip of filter material having opposite faces and parallel longitudinal side edges, a series of pleat score lines formed in a face of said strip and extending parallel to each other and normal to said edges and across the entire strip and serving as hinge lines for the apices of pleats to be formed in the strip, and tuck score lines formed in a face of the strip between each pair of pleat score lines and adjacent each longitudinal edge of the strip and extending to and intersecting said edge at their outer ends and said pleat score lines at their inner ends, said tuck score lines each including a V-section located between adjacent pleat score lines with the tips of the V pointing toward the center of the strip, said tuck score lines also each including a stem score line located between adjacent pleat score lines and extending outwardly from the apex of the V and intersecting the adjacent side edge, said stem score lines forming with said V-sections a series of Y-shaped tuck score lines.

6. A blank as set forth in claim 5 wherein said blank is adapted to be turned into an annulus and the Y score lines on the inner periphery of the annulus are longer than those on the outer periphery of the annulus.

7. The method of making a pleated annular fluid filter element which comprises forming pleat score lines on a face of a straight strip of filter material and Y-shaped end fold score lines on a face of said strip of filter material adjacent to opposite side edges of the strip by passing said strip through scoring rolls, pleating the strip about said pleat score lines and curving the strip into an annulus, compressing and folding the edge portions of the strip about said end fold score lines to form inner and outer annular flattened attachment sections, and molding resilient sealing material to said annular attachment sections to form inner and outer annular seating members.

* * * * *